United States Patent [19]

Tajima et al.

[11] 4,352,174

[45] Sep. 28, 1982

[54] DISC-SHAPED RECORDING MEDIUM REPRODUCING APPARATUS

[75] Inventors: Osamu Tajima, Kanagawa; Takashi Yamamura, Yokohama; Masafumi Mochizuki, Yamato; Yoichi Mita, Tokyo, all of Japan

[73] Assignee: Victor Company of Japan, Ltd., Yokohama, Japan

[21] Appl. No.: 231,868

[22] Filed: Feb. 5, 1981

[30] Foreign Application Priority Data

Feb. 7, 1980 [JP] Japan .................. 55-14221

[51] Int. Cl.$^3$ .......................... G11B 3/00; H04N 5/76
[52] U.S. Cl. ......................................... 369/77
[58] Field of Search ......................................... 369/77

[56] References Cited

U.S. PATENT DOCUMENTS 4,124,866 11/1978 Coleman ................................ 369/77

FOREIGN PATENT DOCUMENTS 2735380  2/1978  Fed. Rep. of Germany ........ 369/77
52-71205  6/1977  Japan .................................... 369/77
52-71206  6/1977  Japan .................................... 369/77

*Primary Examiner*—Steven L. Stephan
*Attorney, Agent, or Firm*—Louis Bernat

[57] ABSTRACT

A reproducing apparatus reproduces a disc-shaped recording medium which is accommodated within a case comprising jacket which has a space for accommodating the disc-shaped recording medium and an opening for allowing the disc-shaped recording medium to go in and out of the jacket, and a lid plate inserted through the opening of the jacket for closing the opening of the jacket. The reproducing apparatus comprises an inserting opening through which the case is inserted a lid plate locking mechanism and disc-shaped recording medium clamping mechanism respectively provided at the innermost part of the reproducing apparatus opposite to the inserting opening with respect to a turntable, for rotating the disc-shaped recording medium, and a jacket opening enlarging mechanism provided in the vicinity of the inserting opening, capable of moving over the turntable between the position in the vicinity of the inserting opening and the innermost part of the reproducing apparatus. The jacket opening enlarging mechanism has an enlarging member for enlarging the opening of the jacket by entering inside the cutouts of the lid plate, upon insertion of the jacket into the reproducing apparatus through the inserting opening. The lid plate locking mechanism has a locking member for locking the lid plate by entering inside the cutouts of the lid plate, upon insertion of the lid plate into the innermost part of the reproducing apparatus together with the jacket. The disc-shaped recording medium clamping mechanism has a clamping member for clamping the disc-shaped recording medium within the jacket by riding over the ride-over part of the lid plate and entering through the enlarged opening of the jacket, upon insertion of the lid plate into the innermost part of the reproducing apparatus together with the jacket.

8 Claims, 17 Drawing Figures

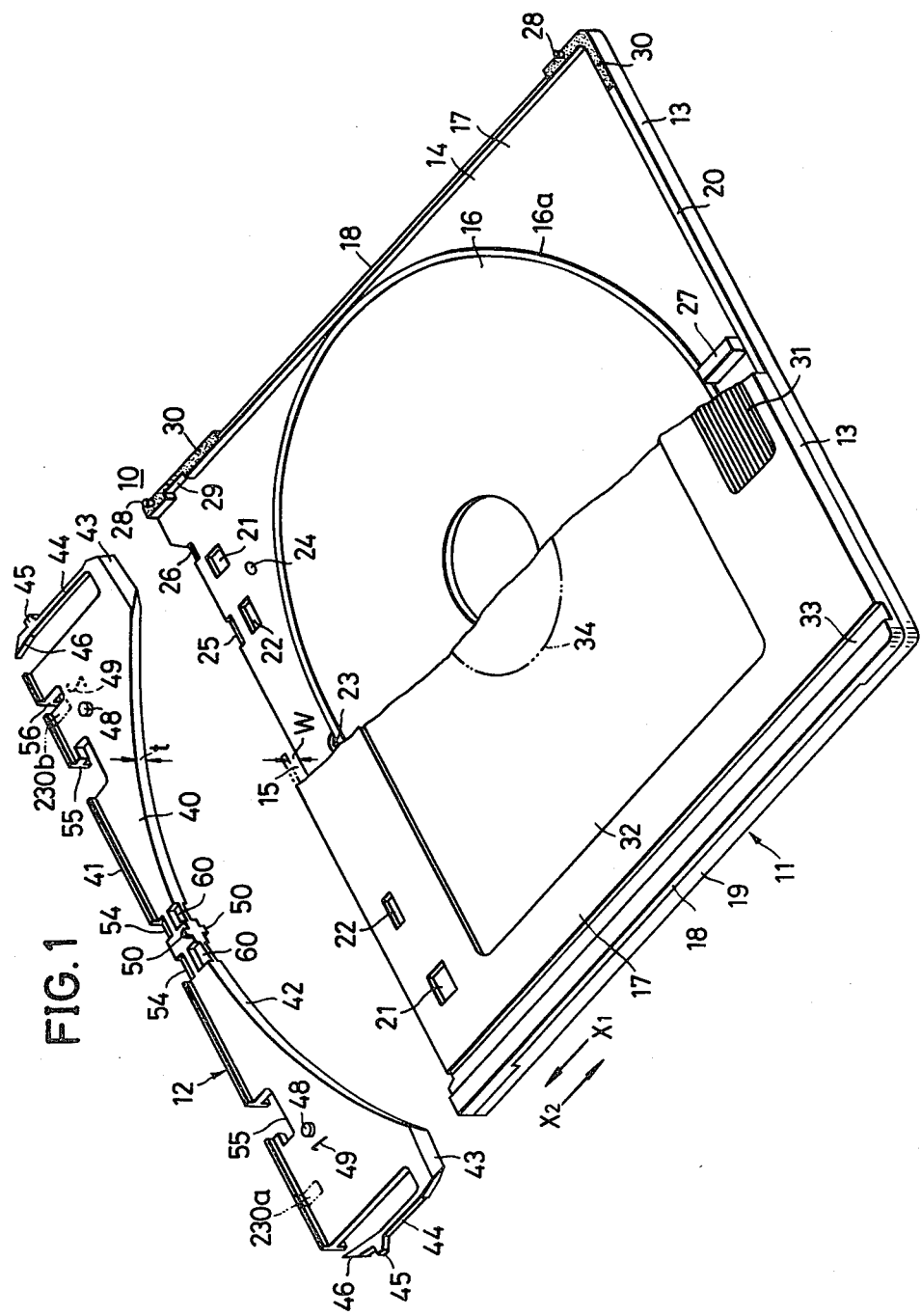

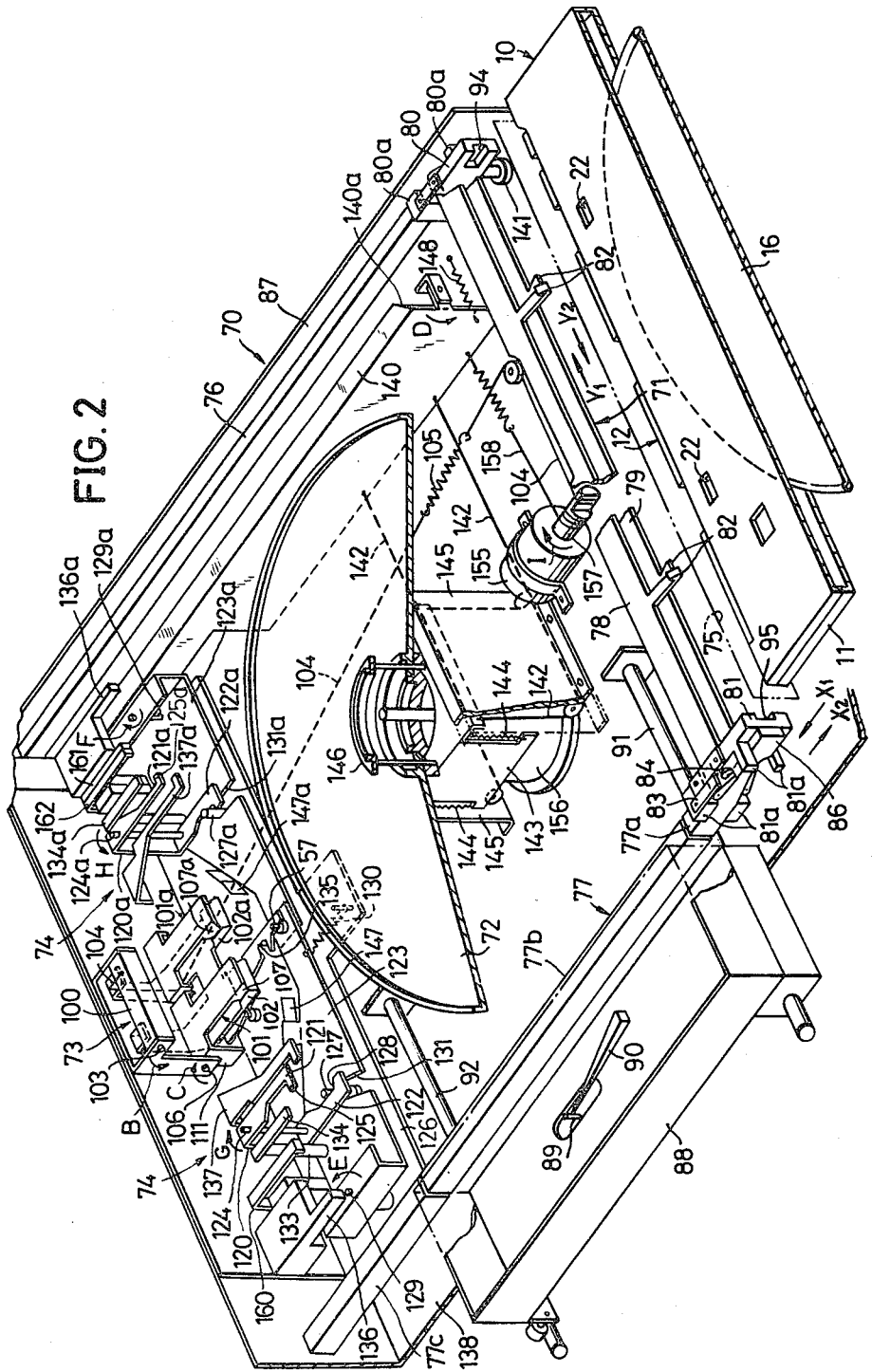

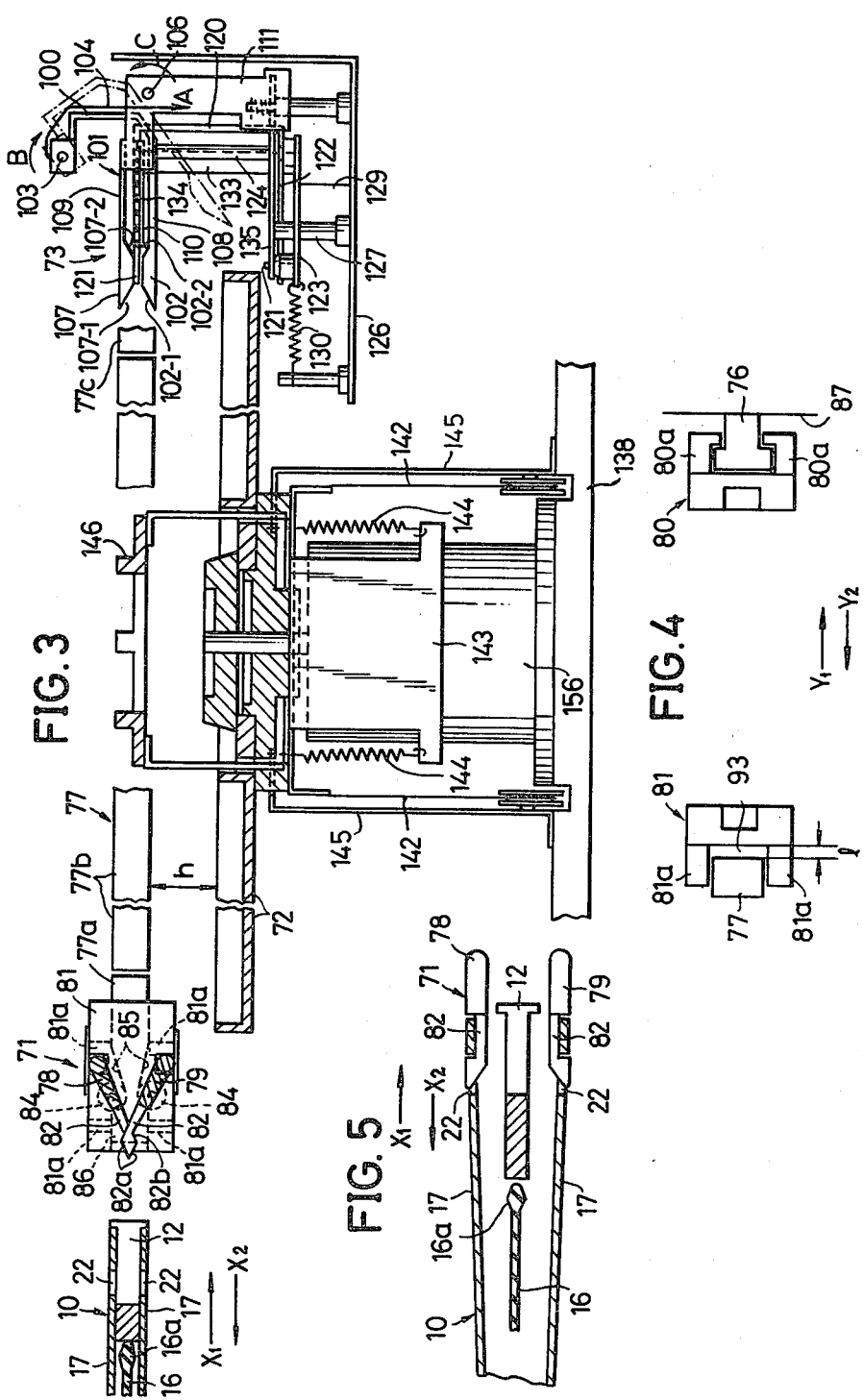

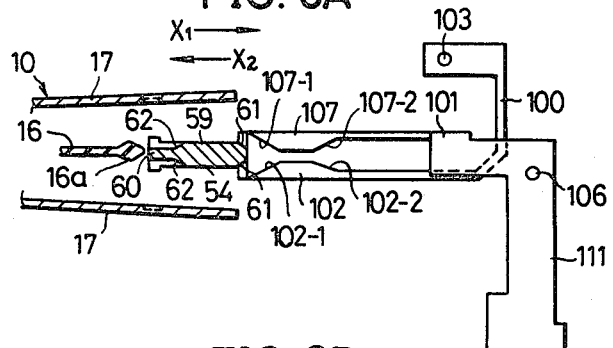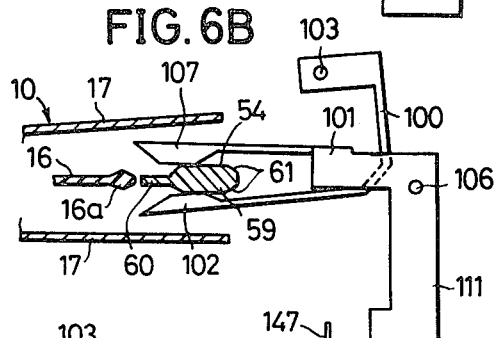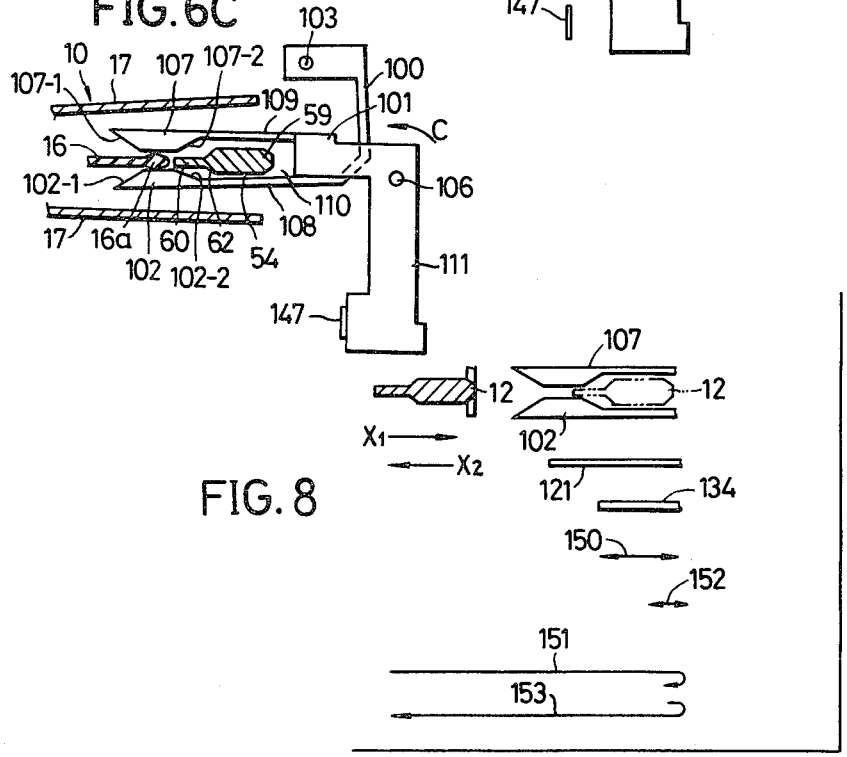

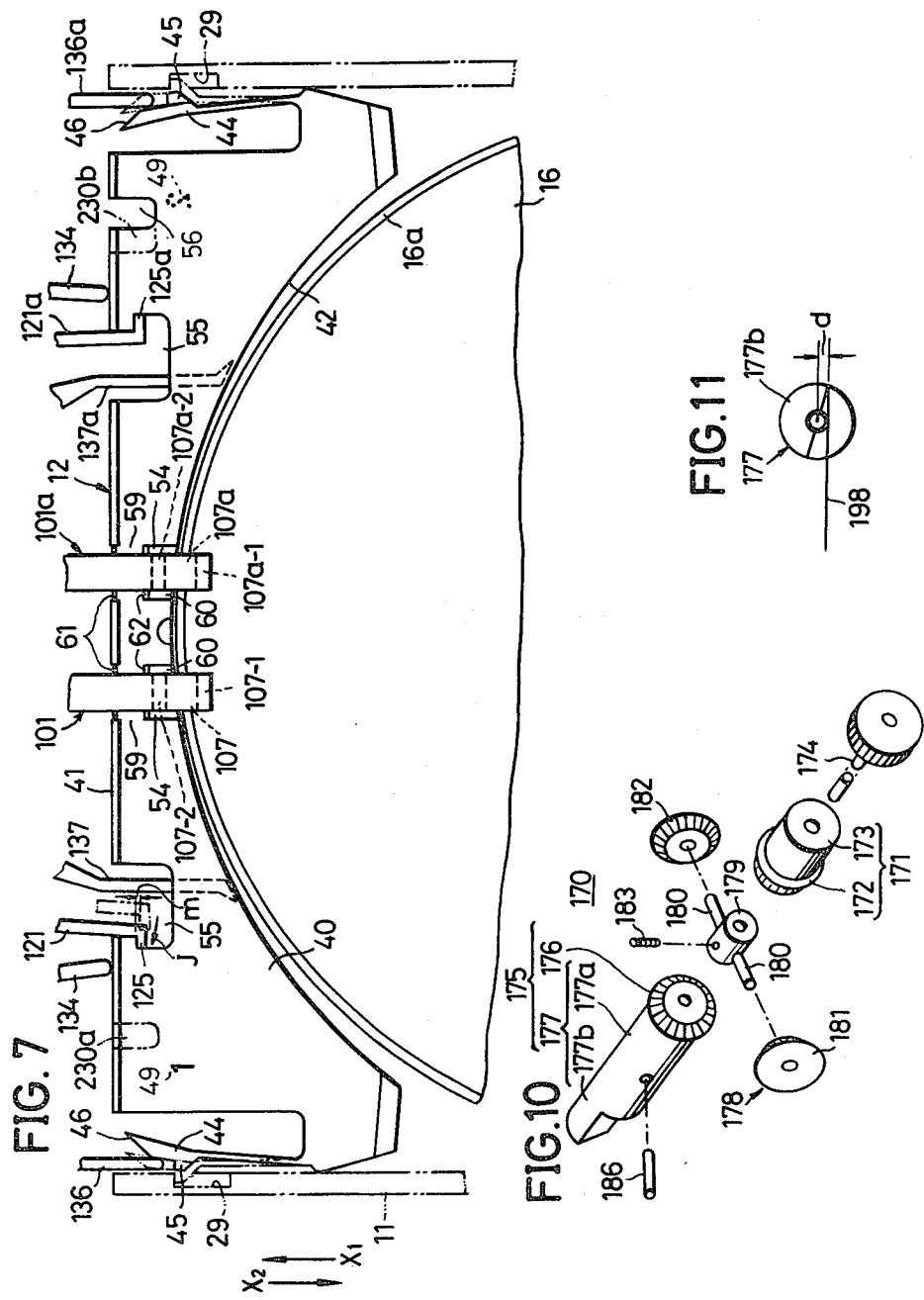

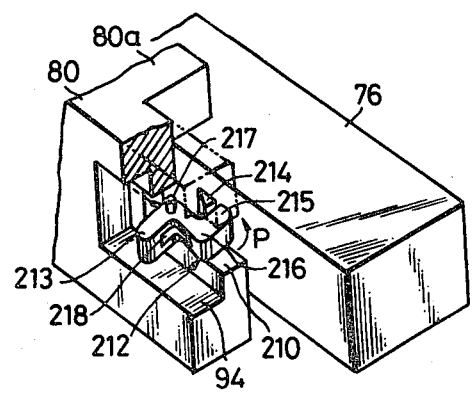
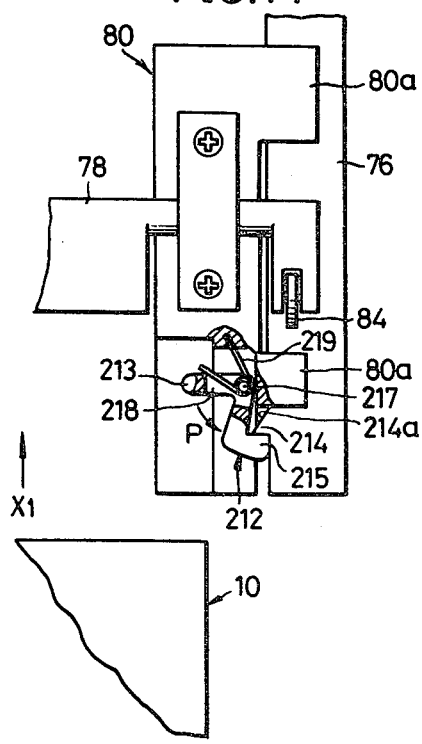
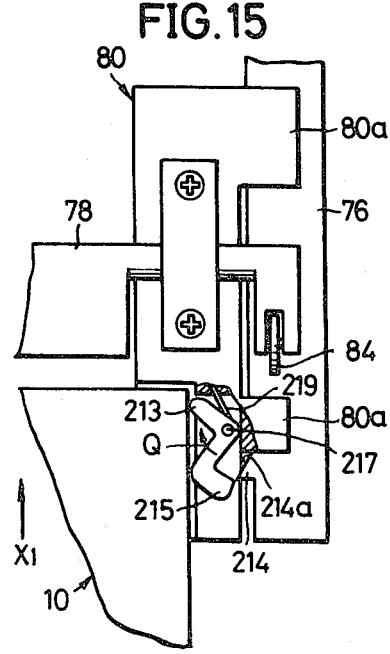

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recording medium in a state possible for reproduction within the reproducing apparatus when a case having a lid for accommodating the recording medium therein is inserted into and then pulled out from within the reproducing apparatus, and also capable of incasing the recording medium within the case so that the recording medium can be obtained outside the reproducing apparatus together with the case, when the empty case is inserted into and then pulled out from within the reproducing apparatus.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon clamping and placing of the disc within the producing apparatus, by inserting into and then pulling out a disc case which has a lid and accommodates a disc therein, from within the reproducing apparatus. In this type of an apparatus, it becomes necessary to positively clamp the disc at an accurate position within the apparatus. However, in the conventional reproducing apparatus, the disc is clamped upon pulling out of the disc case from the reproducing apparatus, for example, and hence, suffered disadvantages in that the disc may not be clamped when the insertion and the pulling out operation of the disc case is rapidly performed, and that the disc may be pulled out from the reproducing apparatus together with the disc case.

Another example of a conventional type of a disc case comprises a rigid jacket for accommodating a disc, and a tray having a front part which is engaged by engaging means upon complete insertion of the disc case within the reproducing apparatus and an annular or ring portion fixed to the front part for encircling the outer periphery of the disc. The reproducing apparatus which operates together with this disc case, is constructed so that when this disc case is inserted within the reproducing apparatus to a predetermined position, the engaging means for the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

SUMMARY OF THE INVENTION

Accordingly, a general object of the present invention is to provide a novel and useful disc reproducing apparatus in which the above described problems have been eliminated.

Another and more specific object of the present invention is to provide a disc reproducing apparatus having a mechanism to enlarge an opening and its adjacent parts of a jacket upon loading of a disc which is incased inside the jacket, into the disc reproducing apparatus. The disc does not make any unnecessary contact with the jacket and scratches are not introduced, when the jacket is pulled out from the reproducing apparatus after placing the disc inside the reproducing apparatus, or when accommodating the disc placed inside the reproducing apparatus into the empty jacket.

Still another object of the present invention is to provide a disc reproducing apparatus having a clamping mechanism which enters inside a jacket to clamp a disc incased inside the jacket, by riding over a lid plate which closes an opening of the jacket. Since the disc is clamped by the clamping mechanism of the reproducing apparatus, the jacket can easily be pulled out from the reproducing apparatus after placing the disc inside the reproducing apparatus, and furthermore, because the lid plate is independent from the operation in which the disc is relatively pulled out from within the jacket, the construction of the disc case becomes quite simple, enabling the disc are to be manufactured at low cost.

Further objects and features of the present invention will be apparent from the following detailed description when read in conjunction with the accompanying drawings.

BRIEF DESCRIPTION OF THE DRAWINGS

FIG. 1 is a perspective view showing an example of a disc case which operates together with a disc reproducing apparatus according to the present invention, with a part cut away and disassembled;

FIG. 2 is a perspective view showing the inner construction of a disc reproducing apparatus according to the present invention, with a part cut away;

FIG. 3 is a partial side view showing the disc reproducing apparatus of FIG. 2;

FIG. 4 is a diagram showing the construction of the member which supports the jacket opening enlarging mechanism, and the guide rail of the apparatus shown in FIGS. 2 and 3;

FIG. 5 is a diagram showing the jacket opening enlarging state during insertion of the disc case;

FIGS. 6A, 6B, and 6C respectively are diagrams showing the disc clamping operation step by step, in which the disc is clamped at the final position of the disc case insertion;

FIG. 7 is a plan view showing a state in which the disc is clamped, and the lid plate of the disc case is locked;

FIG. 8 is a schematic diagram showing the timing of the operation performed by each member upon disc clamping operation and lid plate locking operation;

FIG. 10 is an exploded perspective view showing the essential part of the apparatus of FIG. 9;

FIG. 11 is a diagram showing the construction of the part which takes up the wire for operating the disc clamping operation;

FIG. 13 is an enlarged perspective view showing the essential part of the apparatus of FIG. 12, with a part cut away; and FIGS. 14 and 15 respectively are diagrams showing the state of the locking mechanism before insertion of the disc case, and upon insertion of the disc case, in the apparatus shown in FIG. 12.

DETAILED DESCRIPTION

Figure 9:
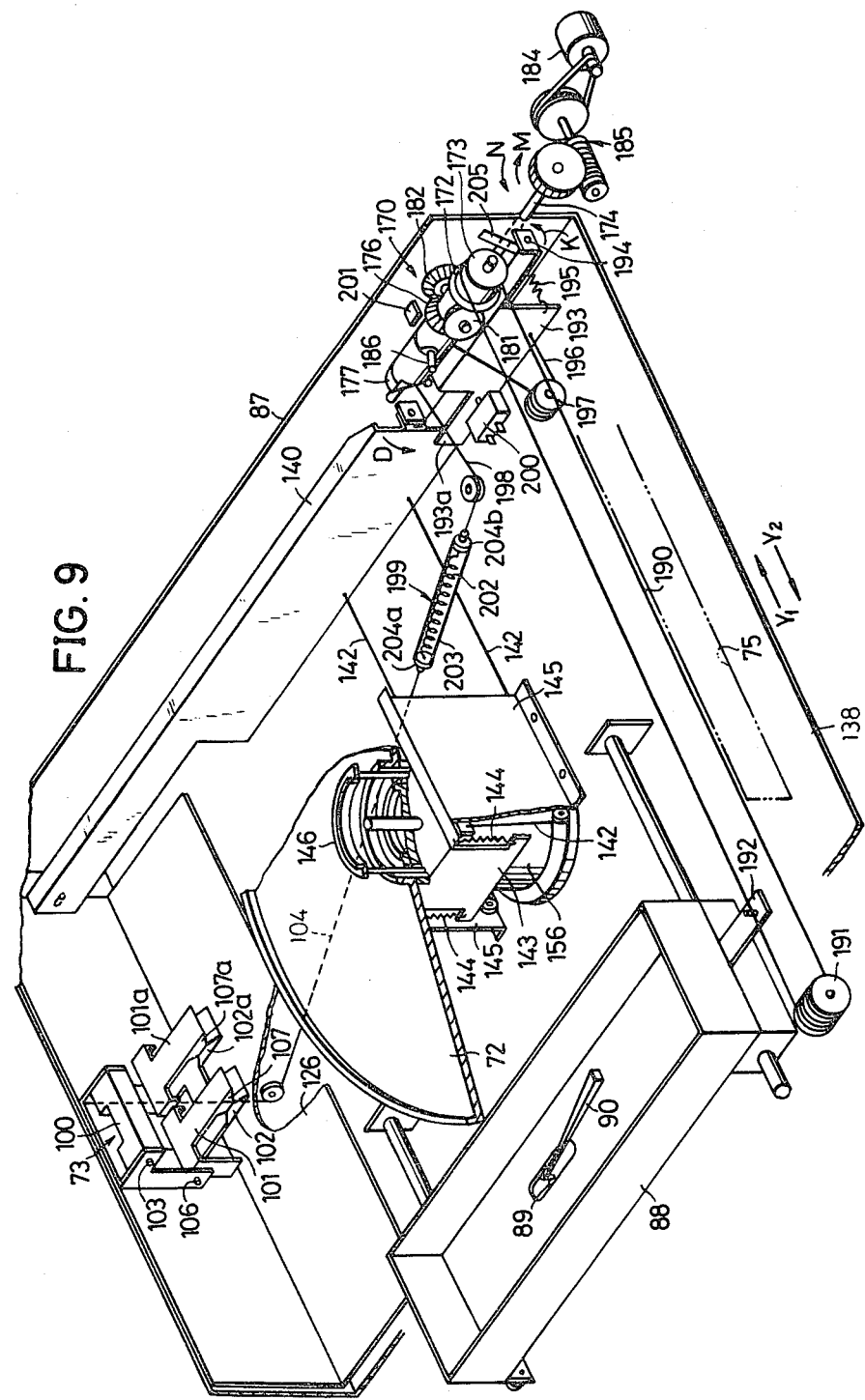
FIG. 9 is a perspective view showing an apparatus constructed to operate the disc rising and lowering operation and the pickup frame moving operation relative to each other.
Figure 12:
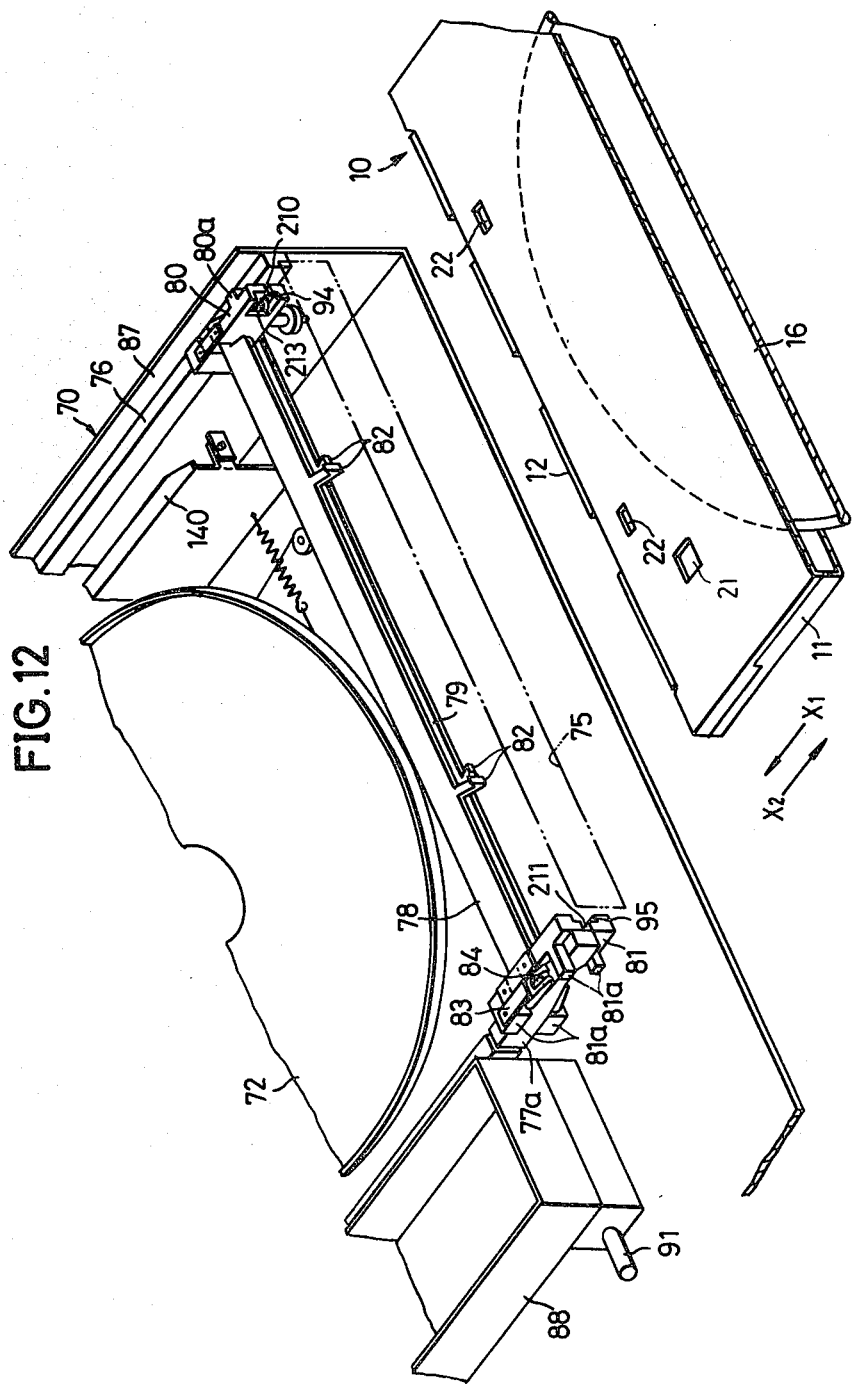
FIG. 12 is a perspective view showing the construction of a reproducing apparatus having a locking mechanism within the jacket opening enlarging mechanism, with a part cut away.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 is open at an opening 15 at the front side of the jacket 11 and is closed on the other three sides, and accommodates a disc 16. The thickness of the space 14 is slightly larger than that of the disc 16. The jacket halves 13 are, for example, made of styrol resin molded from the same mold die, and has a preferable flexibility so as to allow the enlarging of the opening 15 as will be described later, and also has a suitable hardness to protect the disc 16 accommodated therein.

Each of the jacket halves 13 comprises a flat plate part 17 and ribs 18, 19 and 20 which are unitarily formed with the flat plate part 17 and are continuous in the three sides. A display window 21, a pair of engaging windows 22 and 22, a depression 23, and a pair of depressions 24 and 24 are provided on the flat plate part 17. Further, a hole can be provided instead of the depression 23. In addition, depressions can be used instead of the engaging windows 22. Sloping surfaces 25 and 26 are formed at the open edge portion of the flat plate part 17 of the jacket halves 13, and a projection 27 is formed at the innermost portion of the flat plate part 17.

Moreover, a stud 28 for determining the position is formed on the rib 18, and a depression (not shown) which engages to and receives the stud 28 is formed on the rib 19. A depression 29 is formed at a predetermined position near the front inner side surface of each of the ribs 18 and 19.

The pair of jacket halves 13 and 13 are assembled as the jacket 11 by inserting the stud 28 into the opposing depression to match the stud 28 and the depression, and adhering or soldering corner parts 30 of the ribs 18, 19, and 20. Upon the above assembling of the jacket halves 13, the step parts (not shown) of the ribs 18 and 19 are respectively matched with projections (not shown), to form side walls on three sides leaving the opening 15.

Furthermore, a gripping part 31 provided with an antiskip design so that slipping does not occur upon gripping, are respectively formed at the rear central portion of the jacket halves 13. Label affixing parts 32 are provided at the outer surfaces of the jacket halves 13. In addition, grooves 33 are provided at both sides of the jacket halves 13, and these parts of the jacket halves are thinner than the rest of the jacket half parts. The parts other than the parts having the grooves 33 in the jacket halves 13 comprise sufficient strength to protect the disc 16 accommodated therein.

As will be described later, when enlarging the opening 15 of the jacket halves 13, the adjacent parts of the opening 15 can be curved because of their flexibility, however, curved distortion is even more facilitated by the provision of the grooves 33 on both sides of the jacket halves 13. Moreover, since the ribs 18 and 19 are not adhered except for the corner parts 30, the adjacent parts of the side wall parts can be freely distorted upon enlarging of the opening 15, and hence, enlarging of the opening 15 can easily be performed.

As clearly shown in FIG. 1, the lid plate 12 comprises a plate-shaped main lid body 40 which is inserted into the front portion of the space 14 through the opening 15 of the jacket 11 and closes the opening 15, and a rim portion 41 formed unitarily at the front edge of the main lid body 40, which is fixed to the front edge of the jacket 11 and does not enter within the opening 15. The lid plate 12 is, for example, made of acrylonitrile butadiene styrene (ABS) resin. The thickness t of the main lid body 40 is set at a value substantially equal to the width W of the opening 15. An arcuate part 42 having a radius of curvature larger than the radius of the disc 16, is formed at the rear end part of the main lid body 40, and wedge-shaped tapered parts 43 are formed on both sides of the main lid body 40 at the two end parts of the arcuate part 42. A pair of engaging arms 44 and 44 are formed on both sides of the main lid body 40. A projection 45 which engages with the depression 29 of the jacket 11 is provided at the outer side on each of the engaging arm 44, and a sloping surface 46 is formed at the tip end on each of the engaging arm 44.

The base portions of the engaging arms 44 are unitarily formed on the rear end of the main lid body 40 and extend in the forward direction, while the free ends of the engaging arms 44 can undergo resilient distortion. The projection 45 has a slant surface and a vertical surface. When the lid plate 12 enters into the jacket 11 from the opening 15, the slant surface of the projection 45 makes contact with the front end side wall of the jacket 11, and thus, the engaging arm 44 is distorted inward. Upon insertion of the lid plate 12 into a predetermined position within the jacket 11, the projection 44 engages into the depression 29 in the side wall of the jacket 11, due to the flexibility of the engaging arm 44. Accordingly, the vertical surface becomes fixed at the inner surface of the depression 29, and the lid plate 12 is thus prevented from slipping out from the jacket 11. Moreover, the lid plate 12 is of a simple construction as described above, only comprising the rim portion 41 and the main lid body 40, and therefore, the lid plate 12 can easily be manufactured at low cost, only requiring a small amount of material.

A stud 48 which engages with the depression 24 of the jacket 11, is respectively formed on the upper and lower surfaces of the main lid body 40. Furthermore, a display 49 which displays a "1" or a "2" (or, "A" or "B") to indicate the side of the disc 16, is respectively provided at a position corresponding to the position of the display window 21, on the upper and lower surfaces of the main lid body 40. The depression 24 and the stud 48 can be omitted.

A projection 50 which engages to the depression 23 of the jacket 11, is respectively provided on the upper and lower surfaces at the center of the main lid body 40. Clamping finger ride-over parts 54 and 54 each having sloping surfaces and a thin part 60, are respectively formed at the upper and lower surfaces of the main lid body 40 on both sides of the projection 50, where it is narrow because of the shape of the arcuate part 42, so that a clamping finger of the reproducing apparatus, which will be described later on, can easily ride over the clamping finger ride-over parts 44. The thickness of the thin part 60 is similar than that of a groove guard 16a at the outer peripheral edge part of the disc 16.

A pair of L-shaped cutouts 55 and 55 are formed at the front end of the main lid body 40 through the rim portion 41. As will be described later, a lid plate locking finger and jacket opening enlarging finger of the reproducing apparatus are inserted into the cutouts 55. Further, a cutout 56 wherein a disc surface discriminating switch is inserted, is formed at the outer side of one of the cutouts 55, extending from the rim portion 41 into the main lid body 40.

As seen in FIGS. 2 and 3, a reproducing apparatus 70 substantially comprises a jacket opening enlarging mechanism 71, a turntable 72 to rotate the disc 16 positioned thereon, a disc clamping mechanism 73 for clamping the disc 16, a lid plate locking mechanism 74 for locking the lid plate 12, and the like.

Both sides of the jacket opening enlarging mechanism 71 are guided by guide rails 76 and 77, and the enlarging mechanism 71 moves between the innermost part of the reproducing apparatus 70 and a disc case inserting opening 75 provided at the frame of the reproducing apparatus 70, in the directions of the arrows X1 and X2. Upper and lower beams 78 and 79 extend in the directions of the arrows Y1 and Y2 as shown in FIG. 2, and both ends of the respective beams 78 and 79 are supported by supporting members 80 and 81 (sliders). These supporting members 80 and 81 are respectively fixedly inserted into the guide rails 76 and 77. Enlarging fingers 82 are respectively formed on each of the beams 78 and 79, in a direction facing the inserting opening 75 of the reproducing apparatus 70. When the enlarging fingers 82 are positioned on the side of the inserting opening 75, a roller 84 enters inside a tapered depression 85 shown in FIG. 3, due to the action of a leaf spring 83. Hence, the upper beam 78 is inclined downwards, and the lower beam 79 is inclined upwards. Moreover, each enlarging finger 82 makes contact with another enlarging finger 82, and the tip ends of the enlarging fingers 82 coincide at a height at the center of the inserting opening 75. A tapered surface 82a and a step part 82b are formed at the tip end of the enlarging finger 82. When the beams 78 and 79 move in the direction of the arrow X1, the roller 84 rides over the tapered depression 85 so that the beams 78 and 79 are rotated into horizontal positions, and thus, the enlarging fingers 82 rotate in upward and downward directions so as to mutually separate from each other.

The supporting members 80 and 81 are respectively provided with two pairs of fingers 80a and 81a. These fingers 80a and 81a respectively hold the guide rails 76 and 77, and stably guide the supporting members 80 and 81 along the guide rails 76 and 77. A wide portion 86 is formed at the tip end of the tapered depression 85, of the guide rail 77 (and 78). Accordingly, even when the enlarging mechanism 71 is positioned in the vicinity of the disc case inserting opening 75, the two upper and lower fingers 81a perform the guiding function as shown in FIGS. 2 and 3, and hence, the supporting members 81 and 80, that is, the enlarging mechanism 71 is stably held and supported.

The guide rail 76 has a T-shaped cross-section as shown in FIG. 4, and is fixed on the inner surface of the right side wall 87 of the reproducing apparatus 70. The other guide rail 77 has a square cross-section, and is separated into three parts, mainly, a front end rail part 77a, a center rail part 77b, and a rear part 77c. The rail parts 77a and 77c are fixed to the reproducing apparatus 70, while the rail part 77b is fixed to the side surface of a pickup frame 88 and moves together with the pickup frame 88. The pickup frame 88 is provided with a reproducing stylus 89 and a cantilever 90, and moves in the directions of the arrows Y1 and Y2 along guide rods 91 and 92. The center rail part 77b is aligned with the other rail parts 77a and 77c as shown in FIG. 2, when the pickup frame 88 moves in the direction of the arrow Y2 into a waiting position.

The fingers 80a of the supporting member 80 is hook-shaped, and therefore, the supporting member 80 is also restricted of its movement in the directions of the arrows Y1 and Y2. The distance between the supporting members 80 and 81 is determined by the lengths of the upper and lower beams 78 and 79. Thus, the position of the supporting member 81 in the directions of the arrows Y1 and Y2 is determined with reference to the above supporting member 80, that is, with reference to the right side wall 87 of the reproducing apparatus 70. Accordingly, the inserting passage of the disc case is determined with references to the right side wall 87 of the reproducing apparatus 70, and the clamping mechanism, locking mechanism, and the like, are accordingly arranged and positioned with reference to the above right side wall 87. Hence, each mechanism can be accurately arranged and positioned with reference to the same part within the apparatus.

Furthermore, as shown in FIG. 4, the parts of the guide rail 77 which are inserted into the projecting finger 81a of the supporting member 81, especially the rail parts 77a and 77c, are positioned having a gap 93 of length l with respect to the main body of the supporting member 81. This gap 93 compensates for the differences in the waiting position of the pickup frame 88, and the error upon assembling of the reproducing apparatus 70. Therefore, even when the pickup frame 88 stops at a position without returning to the predetermined waiting position, for example, the supporting member 81 does not strike against the rail part 77b, and smoothly moves from the front end rail part to the center rail part 77b. Moreover, by providing the above gap 93, the center rail part 77b can be fixed onto the pickup frame 88.

In addition, a height (distance) h from the surface of the turntable 72 to the guide rails 76 and 77 becomes small, when the reproducing apparatus 70 is constructed so that the center rail part 77b is fixed to the side surface of the pickup frame 88. Hence, a thin-type reproducing apparatus can be constructed. Furthermore, the construction of the reproducing apparatus can be simplified, since the rising distance of a push-up body 146 for pushing the disc 16 above the turntable 72, becomes small, as will be described later on.

The disc clamping mechanism 73 and the lid plate locking mechanism 74 are constructed symmetrically on the left and right sides with respect to a line L which passes through the center of the turntable in the direction of the arrow X1. The parts on one side are designated by the same reference numerals as the corresponding parts on the other side, with a subscript "a", and their description will be omitted.

The disc clamping mechanism 73 is provided at the inner part of the reproducing apparatus 70 on the opposite side of the inserting opening 75, and comprises a pair of upper clamping fingers 101 and 101a. The lower clamping finger 100 unitarily comprises a pair of projected clamping parts 102 and 102a, and is axially supported on an upper pin 103. A wire 104 is linked to the clamping finger 100, and the clamping finger 100 receives a rotational force in the direction of arrow B in FIG. 3 since a force due to the force of a spring 105 is acting in the direction of arrow A. Accordingly, the clamping finger 100 receives a force urging rotation in the upward direction. The pair of upper clamping fingers 101 and 101a are respectively axially supported by a pin 106, and make contact with the clamping parts 102 and 102a the rotation of projecting parts 107 and 107a in the downward direction by their own weight. In addition, the opposing clamping parts 102 and 107 respectively have sloping surfaces 102-1, 102-2, 107-1, and 107-2 formed at their front and rear surfaces. A space 110 which is large enough to support the ride-over part of the lid plate 12 with some play, is formed between horizontal parts 108 and 109 of the clamping fingers 100, 101, and 101a at the rear side of the clamping parts 102 and 107. The other clamping parts 102a and 107a also have the same construction. Furthermore, as will be described later on, upon loading of the disc 16, a vertically extending part 111 is pushed by leaf springs and receives a rotational force in the direction of arrow C, and thus the upper clamping fingers 101 and 101a receive a rotational force in the downward direction. Moreover, the vertically extending part 111 of the upper clamping finger 101 is pushed by the leaf spring 147, 147a, and is urged in the direction of the arrow C (clamping direction).

In the lid plate locking mechanism 74, a locking member 120 is bent and formed into a U-shaped member. An upper locking finger 121 and a lower cam finger 122 of the locking member 120, are axially supported by a pin 124 embeddedly formed on a main lever 123. An L-shaped part 125 is formed at the tip end of the locking finger 121, and a cam 128 which operates together with a fixing pin 127 embeddedly formed on an L-shaped bracket 126, is formed on the cam finger 122. The locking member 120 is urged to rotate in the direction where the cam 128 make contact with the fixing pin 127.

The main lever 123 is axially supported by a shaft 129, and rotates in the clockwise direction by a spring 130. An arcuate cutout 131 makes contact with the pin 127. Furthermore, the main lever 123 is linked to the other main lever 123a by a pin 57 and a longitudinal opening (not shown), and the two levers 123 and 123a rotate in mutually opposite directions. A contact finger 134 which is pushed by the lid plate 12 upon insertion of the disc case 10 inside the reproducing apparatus 70, is fixed on a pin 133.

A latch 135 locks the pin 57 when the pin 57 first moves in the direction of the arrow X1, and then releases the locking of the pin 57 when the pin 57 next moves in the same direction, that is, in the direction of the arrow X1.

Engagement releasing members 136 and 136a are fixed to the main body of the reproducing apparatus 70, and releases the engagement of the lid plate 12 with respect to the jacket 11 upon insertion of the disc case 10.

A supporting finger 137 supports the lower side of the lid plate 12 which is locked at its side by the lid plate locking mechanism 74. The disc clamping mechanism 73, lid plate locking mechanism 74, and the like are assembled as a unit in the L-shaped bracket which is a separate body from a chassis 138, and is assembled onto the chassis 138. Accordingly, the assembling and manufacturing stage is simplified.

Upon reproduction of the disc 16, the disc case 10 is inserted through the inserting opening 75 of the reproducing apparatus 70, by holding the disc case 10 at the gripping part 31, and inserting the disc case 10 with the side of the lid plate 12 into the direction of the arrow X1. This inserting operation is smoothly performed by the function of the tapered surface 82a of the enlarging finger 82. Further, both end parts of the disc case 10 are respectively inserted into depressions 94 and 95 of the supporting members 80 and 81, and the jacket opening enlarging mechanism 71 is pushed and moved in the direction of the arrow X1 by the disc case 10. When the enlarging mechanism 71 moves, the roller 84 slips out of the tapered part 85 to put the upper and lower beams 78 and 79 in horizontal states, and the enlarging fingers 82 thus respectively move in a direction to mutually separate from each other. Accordingly, as shown in FIG. 5, the tip ends of the enlarging fingers 82 engage with the engaging windows 22 of the jacket 11, and enlarge the front part of the upper and lower jacket halves 13 upwards and downwards, to enlarge the opening 15. In addition, since the jacket halves 13 are constructed to easily enlarge the opening 15 as described above, the enlarging operation on the opening 15 can be smoothly performed by a disc case inserting operation with use of a relatively small force.

It is assumed that the disc case 10 is inserted into the inserting opening 75 and the opening 15 is enlarged by the jacket opening enlarging mechanism 71 as described above, and the disc case 10 is then pulled out from within the reproducing apparatus 70 before the disc case 10 is completely inserted into the predetermined position inside the reproducing apparatus 70, to suspend the reproduction of the disc 16. In this case, the projection 45 on the engaging arm 44 of the lid plate 12 is still engaged to the depression 29 in the jacket 11, and hence, when the disc case 10 separates due to the jacket opening enlarging mechanism 71, the lid plate 12 is in its original position with respect to the jacket 11. Accordingly, the disc case 10 returns to its original state when the opening 15 is released from the jacket opening enlarging mechanism 71, preventing the lid plate 12 from accidentally being left inside the reproducing apparatus 70.

Furthermore, a sloping surface 140a of a rotary plate 140 is pushed by a roller 141, and the rotary plate 140 rotates in the direction of the arrow D, due to the movement of the jacket opening enlarging mechanism 71. Accompanied by the rotation of the rotary plate 140, four wires 142 are pulled, and a push-up plate 143 is accordingly pulled downwards. Four corners of the push-up plate 143 are suspended and supported by springs 144 with respect to a support plate 145. Due to the downward movement of the push-up plate 143, the push-up body 146 which is capable of unitarily rotating with the turntable 72 and moving up and down, moves downwards, to retreat from the insertion passage of the disc case 10.

When the disc case 10 is inserted into the innermost part of the reproducing apparatus 70 together with the enlarging mechanism 71 through the upper side of the turntable 72, the ride-over parts 54 of the lid plate 12 enter between the clamping parts 102 and 107 (102a and 107a) which are positioned mutually opposite to the clamping fingers 100, 101, and 101a, and pass through these clamping parts by pushing and spreading these parts. The clamping fingers 100, 101, and 101a close after the ride-over parts 54 of the lid plate 12 have passed through, and the clamping parts 102 and 107 accordingly clamp the groove guard 16a of the disc 16. The ride-over parts 54 of the lid plate 12 are within the space 110 in a state where there is some play, and thus, the disc clamping operation is performed without being limited by the lid plate 12. The lid plate locking operation is performed relative to the above disc clamping operation.

FIG. 7 shows a state where the lid plate 12 is locked and the disc 16 is clamped, and FIG. 8 is a diagram showing the timing of each operation.

The above operations will now be described in more detail. The ride-over parts 54 are formed at the central part of the lid plate 12 where it is narrow with respect to the direction of the arrow X1, and respectively have a thick part 59 (the same thickness as the main body) at the front surface thereof, and a thin part 60 (thinner than the thickness of the groove guard 16a of the disc 16) at the rear side thereof. Tapered sloping surfaces 61 and 62 are formed at the front surface and rear surface sides of the thick part 59. The operation in which the ride-over parts 54 of the lid plate 12 push and spread the clamping fingers to enter therebetween (shown in FIG. 6B), is smoothly performed by the function of the sloping surfaces 61 of the ride-over parts 54 and the sloping surfaces 107-1 and 102-1 of the clamping parts 107 and 102. Hence, the clamping parts 107 and 102 relatively enter between the lid plate 12 and the upper flat plate part 17, and between the lid plate 12 and the lower flat plate part 17. When the thick part 59 of the ride-over part 54 passes through between the clamping parts 107 and 102, and the thin part 60 is between the clamping parts 107 and 102 opposing each other, the clamping parts 107 and 102 mutually close up on one another, and immediately clamp the groove guard 16a of the disc 16 moving in the direction of the arrow X1 at the rear part of the lid plate 12. That is, the disc clamping operation is performed following the ride-over operation of the ride-over parts 54.

In this state, the ride-over parts 54 of the lid plate 12 are accommodated within the space 110 between the horizontal parts 108 and 109 of the clamping fingers 100 and 101, in a state having a gap at the periphery of the ride-over parts 54, as seen in FIG. 6C. Accordingly, the clamping force of the clamping finger 101 is transferred to the groove guard 16a of the disc 16, without being limited by the lid plate 12, and hence, the disc 16 is positively clamped.

Therefore, the disc clamping operation is performed when the disc case 10 is inserted into the final position within the reproducing apparatus 70, and the disc 16 is clamped at a position where the disc 16 has moved in the direction of the arrow X1 to the above final position. Since the final position of the disc case 10 is accurately determined by the latch mechanism, and the edge of the disc 16 in the direction of the arrow X2 is held by the projection 27 of the jacket 11 to be accurately positioned within the disc case 10, the final moving position of the disc 16 can also be accurately determined with respect to the turntable 72. Thus, the disc 16 is clamped and supported above the turntable 72 at a desired position, with high accuracy. Moreover, accidents are avoided in which the disc is pulled out together with the jacket upon pulling out of the jacket outside the reproducing apparatus.

Furthermore, the above ride-over parts 54 each have the thick part 59 provided in the direction of the arrow X1 of the lid plate 12, and the length of the thick part 59 along the directions of the arrows X1 and X2 is made relatively short. The above consideration is made, so that a leaf spring 147 which will be described later, does not act on the vertically extending part 111 of the clamping finger 101, when the clamping parts 102 and 107 are in positions opposing the above thick part 59. In addition, by the above consideration, the thick part 59 can easily pass through between the clamping parts 102 and 107. That is, the ride over parts 54 are constructed so that, upon loading of the disc, the leaf spring 147 pushes against the vertically extending part 111 after the thick part 59 of the ride-over part 54 passes through between the clamping parts 102 and 107, and upon unloading of the disc, the spring 147 separates from the vertically extending part 111 before the thick part 59 of the ride-over part 54 reaches between the clamping parts 102 and 107, as shown in FIGS. 6A and 6B.

Moreover, the thick part 59 of the ride-over part 54 is provided in order to obtain mechanical strength in the lid plate 12. That is, so that the lid plate 12 does not curve at the central narrow part in the direction of the thickness, and so that a gap is not introduced at the front surface side of the disc case 10 which communicates to the disc accommodating space. The central part of the lid plate 12 can be of a thin construction. In this case, the clamping parts 102 and 107 enters within the jacket 11 by passing between the thin part of the lid plate and the upper and lower plates of the jacket 11. Hence, the groove guard 16a of the disc 16 pushes and spreads the clamping parts 102 and 107 to enter therebetween, and to be clamped between these clamping parts 102 and 107.

Accompanied by the insertion of the disc case 10, the locking fingers 121 and 121a relatively enter inside the cutouts 55 of the lid plate 12, and the rim portion 41 accordingly pushes the contact fingers 134 and 134a. In FIG. 8, an arrow 150 shows the stage where the contact fingers 134 and 134a are pushed by the lid plate 12 and move. When the contact fingers 134 and 134a are pushed by the lid plate 12, the main levers 123 and 123a respectively rotate in the directions of the arrows E and F. Due to the above rotation of the main lever 123, the cam 128 of the cam finger 122 is guided by the fixing pin 127, and the locking member accordingly rotates in the direction of the arrow G. Similarly, the locking member 120a rotates in the direction of the arrow H due to the rotation of the main lever 123a. Hence, the locking fingers 121 and 121a rotate in directions so as to mutually separate from each other, and the L-shaped parts 125 and 125a provided at the tip ends of the above locking fingers 121 and 121a respectively enter into the innermost parts of the cutouts 55, to lock the lid plate 12. The lid plate is thus locked at its cutouts 55 by the locking fingers 121 and 121a as shown in FIG. 7, and is limited of its movement in the directions of the arrows X2, Y1, and Y2. Furthermore, the lid plate 12 is limited of its movement in the direction of the arrow X1 by the contact fingers 134 and 134a, and the lid plate 12 is thus locked and supported at the innermost part of the reproducing apparatus 70 in a state in which the lid plate 12 is placed and supported on the supporting fingers 137 and 137a.

Since the lid plate 12 is locked at two positions separated along the directions of the arrows Y1 and Y2, the lid plate 12 is stably held and supported.

The operation of the L-shaped part 125 of the locking finger 121 will now be described. The pin 124 which supports the locking finger 121 is provided at a position away from the tip end part of the contact finger 134, with respect to the shaft 129 of the main lever 123. Further, the L-shaped part 125 projects in the direction towards the contact finger 134. Accompanied by the rotation of the main lever 123 in the direction of the arrow E, the L-shaped part 125 rotates in the direction of the arrow G, that is, in the direction towards the tip end of the contact finger 134. Accordingly, upon locking operation, the L-shaped part 125 moves in the direction of the arrow J (obliquely in the upper direction) from a position shown by the two-dot chain line of FIG. 7 (a gap of length m exist between the L-shaped part 125 and the cutout 55 in the direction of the arrow X1). Then, the L-shaped part 125 positively enters into the innermost part of the cutout 55 without making contact with the corners of the cutout 55, and locks the lid plate 12 and also clamps the lid plate 12 by operating together with the contact finger 134. Since the contact finger 134 is at a position near the L-shaped part 125, the above clamping operation is effectively performed.

Because the pin 57 is latched by the latch plate 135, both the main levers 123 and 123a are held and supported in their rotating positions. The main levers 123 and 123a respectively undergo maximum rotation in the directions of the arrows E, and F, and then slightly rotate in the opposite directions. The leaf springs 147 and 147a are respectively provided on the main levers 123 and 123a, by considering the above rotations in the opposite directions, that is, further rotation of the main levers 123 and 123a from the latching positions.

In FIG. 8, an arrow 151 indicates the moving stage of the lid plate 12 until the lid plate 12 is locked. Due to the relationship between the latch mechanism, the lid plate 12 moves in the backward direction after once reaching the innermost part.

Furthermore, the engagement releasing members 136 and 136a enter inside the openings on the left and right sides of the disc case 10, and push the sloping surfaces 46 at the tip ends of the engaging arms 44. Accordingly, the engaging arms 44 respectively are distorted inwards, and the projections 45 respectively slip out from the depressions 29, to release the engagement of the lid plate 12 with respect to the jacket 11. In FIG. 8, an arrow 152 indicates the period in which the projections 45 are out of the depressions 29.

When the main levers 123 and 123a rotate to positions where they are latched, the leaf springs 147 and 147a respectively provided at the bent parts of the main levers push against the vertically extending part 111 of the upper clamping fingers 101 and 101a. Hence, a rotational force in the direction of the arrow C is applied to each clamping fingers 101 and 101a. Thus, the disc 16 is clamped at a predetermined height by the lower clamping finger 100 and the upper clamping fingers 101 and 101a.

Accordingly, when the disc case 10 is inserted into the final position, the engagement of the lid plate 12 with respect to the jacket 11 is released, and the disc 16 thus becomes clamped by the clamping fingers 100, 101, and 101a. Since the disc 16 is clamped at two positions, at the left and right sides with respect to the center line L, the disc 16 does not unnecessarily rotate within the horizontal plane to deviate from the predetermined position on the turntable 72, or incline towards a certain direction. Moreover, the above clamping operation is positively performed at two positions, because two separate parts are used for the upper clamping fingers to enable independent clamping forces to act on the clamping fingers.

Next, the jacket 11 is pulled out in the direction of the arrow X2. Since the lid plate 12 and the disc 16 are respectively locked and clamped as described above, only the jacket 11 is moved in the direction of the arrow X2, leaving behind the lid plate 12 and the disc 16. Accompanied by this pulling out of the jacket 11, the lid plate 12 and the disc 16 are relatively pulled out from within the jacket 11. Because the opening 15 of the jacket 11 is in an enlarged state then, there is no possibility of the disc 16 being scratched by sliding against the inner surfaces of the jacket 11.

Accompanied by the movement of the jacket 11 in the direction of the arrow X2, the jacket opening enlarging mechanism 71 also moves together with the jacket in the direction of the arrow X2, since the step part 82b of the jacket opening enlarging fingers 82 engages with the engaging windows 22 of the jacket 11. When the jacket 11 is pulled out to the vicinity of the inserting opening 75, the rotary plate 140 rotationally returns due to a spring 148 and the push-up body 146 moves up to support the center part of the disc 16. Furthermore, when the jacket 11 is pulled out, the disc 16 completely separates from the jacket 11, the jacket opening enlarging mechanism 71 returns to its original position, and the jacket opening enlarging fingers 82 rotate in directions so as to mutually close upon each other and separate from the engaging windows 22. The jacket 11 returns to its original state due to its flexibility, and the enlarged opening 15 also returns to the original state, and the jacket 11 is completely pulled out from the reproducing apparatus 70. In this state, the disc 16 is supported horizontally at a position above the turntable 72, by the clamping fingers 100, 101 and 101a and the push-up body 146.

When a play button (not shown) is then pushed, a motor 155 and a turntable motor 156 begin to rotate, and a take-up shaft 157 rotates in the direction of arrow I, and hence wires 104 and 158 are thus pulled out from the take-up shaft 157. Accordingly, the rotary plate 140 rotates in the direction of the arrow D, due to the spring 148 and the clamping finger 100 rotates in a direction opposite to the direction of the arrow B, to release the clamping with respect to the disc 16 and move the push-up body 146 downwards. Hence, the disc 16 moves down and is placed on the turntable 72, to be rotated together with the turntable 72 which is rotated by a motor 156. The push-up plate 143 is then separated from the push-up body 146. The pickup frame 88 moves in the direction of the arrow Y1 from the waiting position, and the disc 16 is relatively scanned by the reproducing stylus 89, to reproduce the information signal.

Next, an operation in which the disc 16 is recovered from within the reproducing apparatus 70, will now be described.

Upon completion of the reproducing operation, the motor 155 rotates in a direction opposite to the direction as the above after the motor 156 and the turntable 72 stop rotating, and the take-up shaft 157 takes up the wires 104 and 158. Accordingly, the rotary plate 140 rotates in a direction so as to loosen the wire 142, and the push-up body 146 thus moves up to push the disc 16 up. The arcuate part 42 of the lid plate 12 has a radius of curvature larger than the radius of the disc 16, and the arcuate part 42 of the lid plate 12 is separated from the disc 16 at both the left and right sides. Accordingly, even when the lid plate 12 is locked in an inclined state, the disc 16 does not make contact with the lid plate 12 upon the upward movement of the disc 16.

Furthermore, the clamping finger 100 rotates in the direction of the arrow B, to clamp the disc 16 between the clamping fingers 101 and 101a. The take-up part of the take-up shaft 157 for taking up the wire 104 has a semi-circular cross section, and the take-up shaft 157 is stopped at a position where it hardly takes up the wire 104 upon starting of the rotation. On the other hand, the wire 158 is taken up by the part of the take-up shaft 157 having circular corss section. Hence, the wire 158 is taken up by the take-up shaft 157 from the start of the rotation of the take-up shaft 157, and the wire 104 is taken up after a slight time delay. Therefore, the clamping operation by the clamping finger 100 is performed after the disc 16 is pushed upwards by the push-up body 146, and the disc 16 is then positively clamped.

Upon recovering of the disc 16, the empty jacket 11 is inserted with its front end first into the reproducing apparatus 70 through the inserting opening 75. The jacket opening enlarging mechanism 71 is pushed by the jacket 11 and moves again in the direction of the arrow X1, to enlarge the opening 15 of the jacket 11. Accompanied by the insertion of the jacket 11 in the direction of the arrow X1, the disc 16 is relatively inserted inside the jacket 11 through the opening 15. Since the opening 15 is in the enlarged state then, there is no possibility of the disc 16 being scratched by sliding against the inner surfaces of the jacket 11.

Accompanied by the above insertion of the jacket 11, the rotary plate 140 is rotated after inserting of the disc 16 into the jacket 11 is started, and the push-up body 146 moves down to a lower position to recede from the moving passage of the jacket 11.

When the jacket 11 is inserted into the innermost position inside the reproducing apparatus 70, the disc 16 becomes completely incased within the jacket 11, and furthermore, the locked lid plate 12 is relatively inserted within the opening 15 of the jacket 11. Upon insertion of the lid plate 12 into the jacket 11, even when the lid plate 12 is slightly inclined, the position of the lid plate 12 is corrected by the guide given by the tapered parts 43, and thus, the above insertion of the lid plate 12 inside the jacket 11 is positively performed.

When the jacket 11 is inserted into the final position, the disc 16 is accommodated within the jacket 11, and the main part of the lid plate 12 which has been locked, is inserted inside the jacket opening 15. The jacket 11 is further inserted in the direction of the arrow X1, even after the lid plate 12 is completely inserted. Hence, the main levers 123 and 123a respectively rotate in the directions of the arrows E and F from the latching position, to release the latch of the pin 57 by the latch plate 135. Accordingly, the jacket 11 is urged in the direction of the arrow X2 by a force due to the spring 130. This force due to the spring 130 is applied to the jacket 11 through the main lever 123, contact finger 134, and lid plate 12.

Therefore, when the jacket 11 is pulled out in the direction of the arrow X2, the lid plate 12 is first pushed by the contact finger 134 due to the operation of the spring 130, and then follows the jacket 11 in a state where the lid plate 12 is pushed against the opening 15 of the jacket 11. By this movement of the lid plate 12, the sloping surface 46 partially separates from the engagement releasing member 136. Thus, the engaging arm 44 rotates outward, and the projection 45 engages inside the depression 29, to put the lid plate 12 in a state where the lid plate 12 is engaged to the jacket 11. The lid plate 12 then moves in the direction of the arrow X2 together with the jacket 11, and the disc 16 is pushed by the arcuate part 42 of the lid plate 12 and forcibly pushed out in the direction of the arrow X2 by the clamping part. Accordingly, the disc 16 is accommodated within the jacket 11 and moves together with the jacket 11, in a state where the disc 16 is prevented from slipping out of the jacket 11 by the lid plate 12, and separates from the reproducing apparatus 70 to be recovered within the disc case 10. Furthermore, due to the operations of the sloping surfaces 62 and the sloping surfaces 102-2 and 107-2 of the clamping parts 102 and 107, the ride-over parts 54 of the lid plate 12 smoothly push and spread the clamping parts 102 and 107 so as to mutually separate these clamping parts, and pass through between these clamping parts 102 and 107 to project out from the space 110. This operation in which the ride-over parts 54 of the lid plate 12 pass through between the clamping parts, is positively performed since the lid plate 12 is engaged to the jacket 11. Further, an arrow 153 of FIG. 8 indicates the moving stage of the lid plate 12 upon the above operation.

In addition, when the jacket 11 is pulled out together with the lid plate 12, the main levers 123 and 123a rotationally return to the original positions due to the spring 130, by rotating in opposite directions as the directions of the arrows E and F. In response to the above operation, the locking fingers 121 and 121a rotate in directions so as to close upon each other, and slip out from within the innermost part of the cutouts 55.

When the jacket 11 is pulled out to the vicinity of the inserting opening 75 of the reproducing apparatus 70, the enlarging mechanism 71 closes, the opening 15 of the jacket 11 closes, the enlarging fingers 82 slip out from the engaging windows 22 of the jacket 11, and the disc case 10 is obtained outside the reproducing apparatus 70. Hence, the disc 16 is separated from the reproducing apparatus 70, and recovered within the disc case 10.

Moreover, a first side detection switch 160, a second side detection switch 161, disc type discriminating switch 162 are respectively provided at predetermined positions at the innermost part of the reproducing apparatus 70. In the above embodiment of the invention, the lid plate 12 is for a video disc, and in the state shown in FIGS. 1 and 7, the lid plate 12 and the disc 16 have their first sides facing up. When the disc case 10 is inserted within the reproducing apparatus 70 in this state, the switches 160 and 162 are pushed by the rim portion 41 of the lid plate 12 and are turned ON. The switch 161 enters the cutout 56 of the lid plate 12 and is in the OFF state. It is detected that the disc 16 is loaded with the first side facing up by the turning ON of the switch 160, and further, it is detected that the disc 16 is a video disc by the turning ON of the switch 162.

When the disc case 10 is inserted into the reproducing apparatus 70 with the sides reversed from the above state, with the second side of the disc 16 facing up, the switch 160 is in the OFF state since the cutout 56 of the lid plate 12 is positioned at the left side in FIGS. 1 and 7. However, the switch 161 is pushed by the rim portion 41 of the lid plate 12 and is turned ON, to detect the second side of the disc 16.

When using a PCM audio disc as the disc 16, a lid plate additionally provided with cutouts 230a and 230b shown by two-dot chain lines of FIGS. 1 and 7 on symmetrical positions on the left and right, is used. In this case, even when the disc case 10 is inserted into the innermost part of the reproducing apparatus 70, the discriminating switch 162 enters within the cutout 230a or 230b and is in the OFF state. Accordingly, it is detected that the disc inserted is a PCM audio disc. The detection of the sides of the disc is performed in the same manner as in the case of the above described video disc.

Next, a construction which enables the up-and-down movement of the disc and the moving operation of the pickup frame to be automatically and successively performed by use of one motor, will be described in conjuction with FIGS. 9 and 10. In FIG. 9, those parts which are the same as those corresponding parts in FIG. 2 will be designated by the like reference numerals.

A differential gear device 170 is provided at the front right hand side of the reproducing apparatus 70. A first gear member 171 unitarily comprises a bevel gear 172 and a drum 173, and is rotatably supported by a driving shaft 174. Similarly, a second gear member 175 comprises a bevel gear 176 and a take-up drum 177, and is rotatably supported by the driving shaft 174. The take-up drum 177 comprises a tubular part 177a and a semi-circular cross section part 177b. A third gear member 178 is constructed so that bevel gears 181 and 182 are rotatably supported by pins 180 projecting in the diametral direction from a boss 179, where the boss 179 is fixed to the driving shaft 174.

The driving shaft 174 is rotated by a motor 184 through a worm gear mechanism 185. Moreover, the motor 184 and the worm gear mechanism 185 are in reality positioned at the other end of the driving shaft 174, that is, inside the reproducing apparatus.

A pickup frame moving wire belt 190 is strung between the drum 173 and a drum 191. An arm 192 which projects out from the pickup frame 88, is fixed to a part of the wire belt 190.

A rotary plate 193 is axially supported by a shaft 194, and is urged to rotate in the direction of arrow K by a spring 195. This spring force urged by the spring 195, is selected to be larger than the total spring force of the four springs 144 supporting the push-up plate 143. A wire 196 is strung between the rotary plate 193 and a pin 186 embedded in the take-up drum 177, through a pulley 197.

A disc clamping wire 198 is wound and fixed to the semi-circular cross section part 177b of the take-up drum 177. In addition, a spring mechanism 199 is provided at a halfway point on the wire 198.

In the above differential gear device 170, the gear having a smaller rotational load of the first and second gears 171 and 175, is selectively rotated. The moving load of the pickup frame 88 is larger than the operational load upon lowering of the disc, and smaller than the operational load upon raising of the disc.

When the disc 16 is clamped within the reproducing apparatus and positioned above the turntable 72, the differential gear 170 and the pickup frame are in states shown in FIG. 9. Hence, a detection switch 200 is pushed by the rotary plate 193 and is in an ON state, and has a function to confirm the above states. Thus, when the play operation is operated, the motor 184 starts rotating, and the driving shaft 174 rotates in the direction of arrow M. Accordingly, the second gear 175 having a small load rotates in the direction of the arrow M, to loosen the wire 196, and the rotary plate 193 accordingly rotates in the direction of the arrow K due to the spring 195. Therefore, the rotary plate 140 is pushed by an extending arm 193a of the rotary plate 193 to rotate in the direction of the arrow D, and the push-up body 146 moves down as in the above case. Further, the wire 198 becomes loose, and releases the clamping of the disc.

When the second gear 175 rotates by a predetermined angle, the pin 186 hits a fixed fin 201 fixed on the right side wall 87, to limit the rotation. Thus, the rotational load of the second gear 175 becomes larger than that of the first gear 171, and the first gear 171 then starts to rotate in the direction of the arrow M. Due to this rotation of the first gear 171, the wire 190 travels, and the pickup frame 88 is thus moved at high speed in the direction of the arrow Y1, to a position where the pickup frame 88 opposes the left edge of the disc 16. Moreover, the moving of the pickup frame 88 upon reproduction is also performed by the above motor 184.

By performing an operation to finish the reproduction, the motor 184 starts to rotate in the opposite direction. Accordingly, the driving shaft 174 also starts to rotate in the opposite direction as the above, namely, in the direction of the arrow N, and the first and second gears 171 and 175 are urged to rotate in the same direction, that is, in the direction of the arrow N. The rotation of the second gear 175 accompanies an operation in which the rotary plate 193 is rotated against the powerful force exerted by the spring 195, and hence, the rotational load of the second gear 175 becomes larger than that of the first gear 171. Thus, the first gear 171 starts to rotate in the direction of the arrow N, and the pickup frame 88 is moved in the direction of the arrow Y2.

The pickup frame 88 returns to the waiting position, and is held by a stopper (positioned at the left side wall of the chassis 138, and not shown in the figure). Therefore, the rotational load becomes large since the first gear 171 stops rotating, and the second gear 175 then starts to rotate in the direction of the arrow N. Accompanied by this rotation of the second gear 175, the tubular part 177a takes up the wire 196, and the rotary plate 193 starts to rotate against the spring 195. Accordingly, the push-up body 146 rises as in the case described above. Furthermore, as in the case above, the semi-circular cross section part 177b takes up the wire 198 after a slight delay, and the lower clamping finger 100 rotates to clamp the disc 16 between the upper clamping fingers 101 and 101a.

The wire 198 is taken up until a spring 202 within the spring mechanism 199 slightly further pulls on the wire 198, and the disc clamping force is accordingly applied. At the final point, the semi-circular cross section part 177b takes up the wire 198 in a state shown in FIG. 11. Hence, the distance d shown in FIG. 11 becomes small, and the wire 198 is accordingly taken up by a strong force. In addition, the motor 184 stops when the rotary plate 193 pushes the detection switch 200.

Accordingly, the up-and-down movement of the disc and the moving operation of the pickup frame is relatively performed by use of one motor, mainly, the motor 184. Furthermore, there is no need for a detection switch to switch over between the two operations.

The spring mechanism 199 is constructed so that the spring 202 is provided between side caps 204 and 204a at both ends of the tubular part 204, in a state where the spring 202 is expanded. The caps 204 and 204a are respectively connected to the wire 198. Accordingly, a relatively large pulling force can be applied to the wire 198 by use of a spring having a relatively small spring constant, where the displacement due to the pulling force of the spring is smaller than that upon a state described above.

A stopping fin 205 is bent and formed on a part of the rotary plate 193. This stopping fin 205 recedes from the moving passage in the direction of the arrow X1 of the enlarging mechanism 71, to enable the loading and the unloading and recovering operation of the disc upon a state shown in FIG. 9. Moreover, in a state where the rotary plate 193 rotates obliquely, the stopping fin 205 limits the movement in the direction of the arrow X1 together with the supporting member 80. Therefore, the insertion of the disc case 10 inside the reproducing apparatus is allowed only when the push-up body 146 is in a raised state, and insertion of the disc case 10 upon any other states is prevented.

Next, a mechanism which is assembled in the enlarging mechanism 71 and locks the enlarging mechanism in the vicinity of the disc case inserting opening 75, will now be described in conjunction with FIGS. 12 through 15. In FIGS. 12 through 15, those parts which are the same as those corresponding parts in FIG. 2 will be designated by the like reference numerals.

The locking mechanisms are respectively provided in front cutout grooves 210 and 211 of the supporting members 80 and 81, on both sides of the enlarging mechanism 71. The construction of these locking mechanism is symmetrical on both sides, and thus, the locking mechanism within the right hand side supporting member 80 will be described in the following.

The cutout groove 210 extends in the direction of the arrow X1 from the front end surface of the supporting member 80, and formed at a position where the height is at the center of the depression 94. A Z-shaped locking arm 212 comprises a locking arm 213 which is pushed by the edge part of the inserted disc case 10, an engaging arm 215 which engages with a projection 214 of the guide rail 76, and a connecting arm 216 which connects the locking arm 213 and the engaging arm 216. The part between the locking arm 213 and the connecting arm 216 is axially supported by a pin 217. This locking arm 212 urged to rotate in the direction of arrow P within a center cutout 218, by a torsion spring 219 connected to the pin 217. Therefore, as shown in FIG. 14, the engaging arm 215 engages to the projection 214, and the locking arm 213 projects within the depression 94. The projection 214 has a sloping surface and a vertical surface, and projects within the cutout groove 210.

Accordingly, the engaging arm 215 holds the vertical surface of the projection 214 at both sides of the enlarging mechanism 71, to limit the movement towards the direction of the arrow X1.

When the disc case 10 (or the jacket 11) is inserted inside the reproducing apparatus 70 in a normal manner, the disc case 10 (or the jacket 11) passes through the inserting opening 75 as shown in FIG. 15, and the closed enlarging fingers 82 enter within the engaging windows 22. The side parts of the disc case 10 (or the jacket 11) then respectively enter within the depressions 94 and 95 of the supporting member 80 and 81, and push the locking arm 213 of both the locking arms 212. Therefore, the locking arm 213 is rotated in the direction of arrow Q, and the engagement between the engaging arm 215 and the projection 214 is released simultaneously on both sides. Hence, the enlarging mechanism 71 is put in a state where it is movable in the direction of the arrow X1.

Thus, by further inserting the disc case 10 (or the jacket 11), the enlarging mechanism 71 moves in the direction of the arrow X1, and enlarges the opening 15 of the jacket 11. When the disc case 10 (or the jacket 11) is pulled out and the enlarging mechanism returns to the original position, the engaging arm 215 of the locking arm 212 rides over the sloping surface 214a of the projection 214. Accordingly, the engaging arm 215 automatically engages to the projection 214, as shown in FIG. 14.

Since the above described locking mechanism is provided, the enlarging mechanism 71 can be positively held and supported at a predetermined position, even when vibrations or shocks are applied to the reproducing apparatus upon transporting the reproducing apparatus. Moreover, the enlarging mechanism does not open even when the operator pushes the enlarging mechanism by a stick or his finger. In addition, when the disc case 10 is inserted from the wrong side, that is, from the gripping part of the disc case, the disc case 10 does not reach the depressions 94 and 95 since the gripping part of the disc case 10 hits the closed enlarging fingers 82. Accordingly, the locking operation is not released, and mistaken insertion is thus prevented. Furthermore, the above mistaken insertion is also prevented when a disc case having a different size is tried to be inserted.

When the enlarging fingers 82 are slightly open, the front end part of the disc case (front end surface of the jacket) hits the enlarging fingers 82 even when the disc case is inserted in a normal manner. Hence, the disc case pushes the enlarging mechanism 71 as in the above case, and the insertion of the disc case is prevented. Furthermore, since the locking mechanisms are provided on both sides, both locking mechanisms do not release when the disc case is inserted at an angle with respect to the horizontal plane in the direction of the insertion, and the enlarging mechanism 71 does not move. Accordingly, the opening of the jacket is prevented from opening at only one side, when only one locking mechanism releases in the above case. Moreover, even when one locking mechanism is released by a stick and the like, and therefore, the safety factor is improved. In addition, it is assumed that both locking mechanisms cannot be released simultaneously by mischief.

Further, this invention is not limited to these embodiments but various variations and modifications may be made without departing from the scope of the invention.

What is claimed is:

1. A reproducing apparatus for reproducing a disc-shaped recording medium which is accommodated within a case, said case comprising a jacket which has a space for accommodating said disc-shaped recording medium and an opening for allowing said disc-shaped recording medium to go in and out of said jacket, and a lid plate inserted through said opening of said jacket for closing said opening of said jacket, said lid plate having cutouts and ride-over parts, said reproducing apparatus comprising:
an inserting opening through which said case is inserted;
a turntable for rotating said disc-shaped recording medium;
lid plate locking means and disc-shaped recording medium clamping means respectively provided at the innermost part of said reproducing apparatus opposite to said inserting opening with respect to said turntable; and
jacket opening enlarging means provided in the vicinity of said inserting opening, capable of moving over said turntable between the position in the vicinity of said inserting opening and said innermost part of said reproducing apparatus,
said jacket opening enlarging means having an enlarging member for enlarging said opening of said jacket by entering inside said cutouts of said lid plate, upon insertion of said jacket into said reproducing apparatus through said inserting opening,
said lid plate locking means having a locking member for locking said lid plate by entering inside said cutouts of said lid plate, upon insertion of said lid plate into the innermost part of said reproducing apparatus together with said jacket,
said disc-shaped recording medium clamping means having a clamping member for clamping said disc-shaped recording medium within said jacket by riding over said ride-over part of said lid plate and entering through the enlarged opening of said jacket, upon insertion of said lid plate into said innermost part of said reproducing apparatus together with said jacket, and
said jacket being pulled out in an empty state leaving behind said lid plate locked by said lid plate locking means and said disc-shaped recording medium clamped by said disc-shaped recording medium clamping means, when said jacket is pulled out from within said reproducing apparatus in a direction opposite to the direction of the insertion.

2. A reproducing apparatus as claimed in claim 1 which further comprises a raising and lowering member capable of moving up and down by passing through the central part of said turntable, first means for moving said raising and lowering member down upon insertion of said jacket into said reproducing apparatus and moving said raising and lowering member up upon pulling out of said jacket from said reproducing apparatus, and second means for releasing the clamping operation by said clamping member with respect to said disc-shaped recording medium by a reproducing operation and moving said raising and lowering member down, said disc-shaped recording medium which is released from the clamping operation by said clamping member being placed and positioned on said raising and lowering member to be lowered together with the downward movement of said raising and lowering member onto said turntable.

3. A reproducing apparatus as claimed in claim 2 in which said second means raises said disc-shaped recording medium by raising said raising and lowering member by a reproduction finishing operation, and clamps said discshaped recording medium by said clamping member.

4. A reproducing apparatus as claimed in claim 1 in which
said lid plate of said case has a construction to enable said lid plate to be locked to said jacket,
said reproducing apparatus further comprises lock releasing means for releasing the lock of said lid plate by said lid plate locking means upon insertion of said case into said innermost part of said reproducing apparatus, and pushing back means for pushing said lid plate back in a direction opposite to the direction of the insertion of said jacket upon insertion of said jacket into said innermost part of said reproducing apparatus,
said lid plate following the movement of said jacket by said pushing back means and separating from said lock releasing means to be locked by said jacket, upon pulling of said jacket accommodated with said disc-shaped recording medium therein outside said reproducing apparatus, and
said disc-shaped recording medium being pushed by said lid plate to be released from the clamping due to said clamping means, upon pulling out of said jacket.

5. A reproducing apparatus as claimed in claim 1 in which said jacket opening enlarging means further comprises a pair of upper and lower beam members extending parallel to said inserting opening and provided with said enlarging member which faces towards said inserting opening, guiding member for guiding said beam members from the vicinity of said inserting opening to said innermost part of said reproducing apparatus in the direction of the insertion of said case, and means provided at the side end part of said guiding member adjacent to said inserting opening, for rotating said beam members so as to mutually separate said beam members upon moving of said beam members in the direction of the insertion.

6. A reproducing apparatus as claimed in claim 1 in which said cutouts of said lid plate are substantially of flat L-shape, and said lid plate locking means further comprising means for rotating said locking member to lock said locking member into the innermost part of said L-shaped cutout upon insertion of said jacket into said innermost part of said reproducing apparatus.

7. A reproducing apparatus as claimed in claim 1 which further comprises a disc-shaped recording medium side detection switch at the innermost part of the reproducing apparatus, in which said lid plate has a cutout at a position respective of the side of the incased disc-shaped recording medium wherein said disc-shaped recording medium side detection switch enters.

8. A reproducing apparatus as claimed in claim 1 which further comprises a disc-shaped recording medium type detection switch at the innermost part of the reproducing apparatus, in which said lid plate has a cutout at a position respective of the type of the incased disc-shaped recording medium wherein said disc-shaped recording medium type detection switch enters.

* * * * *